US010267917B2

(12) United States Patent
Wang et al.

(10) Patent No.: US 10,267,917 B2
(45) Date of Patent: *Apr. 23, 2019

(54) DISTANCE MEASURING METHOD AND APPARATUS

(71) Applicant: PIXART IMAGING INC., Hsin-Chu (TW)

(72) Inventors: Guo-Zhen Wang, Hsin-Chu (TW); Ming-Tsan Kao, Hsin-Chu (TW)

(73) Assignee: PIXART IMAGING INC., Hsin-Chu, Taiwan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/953,554

(22) Filed: Apr. 16, 2018

(65) Prior Publication Data

US 2018/0231662 A1 Aug. 16, 2018

Related U.S. Application Data

(63) Continuation of application No. 14/821,966, filed on Aug. 10, 2015, now Pat. No. 9,977,129.

(30) Foreign Application Priority Data

Dec. 29, 2014 (TW) .............................. 103146061 A

(51) Int. Cl.
*G01C 3/08* (2006.01)
*G01S 17/89* (2006.01)
*G01S 17/46* (2006.01)

(52) U.S. Cl.
CPC ............. *G01S 17/89* (2013.01); *G01S 17/46* (2013.01)

(58) Field of Classification Search
CPC .................................. G01S 17/89; G01S 17/46
USPC ......................................................... 356/4.01
See application file for complete search history.

(56) References Cited

U.S. PATENT DOCUMENTS

| | | | |
|---|---|---|---|
| 9,418,291 B2* | 8/2016 | Sonoda | B25J 9/1612 |
| 9,977,129 B2* | 5/2018 | Wang | G01S 17/46 |
| 2002/0057832 A1* | 5/2002 | Proesmans | G01B 11/2513 |
| | | | 382/154 |
| 2011/0081072 A1* | 4/2011 | Kawasaki | G01B 11/25 |
| | | | 382/154 |
| 2011/0131225 A1* | 6/2011 | Mayer | G06Q 10/06 |
| | | | 707/758 |
| 2013/0321582 A1* | 12/2013 | Huang | G01B 11/303 |
| | | | 348/46 |
| 2014/0293009 A1* | 10/2014 | Nakazato | G01B 11/26 |
| | | | 348/46 |

* cited by examiner

*Primary Examiner* — Mark Hellner
(74) *Attorney, Agent, or Firm* — Li & Cai Intellectual Property (USA) Office

(57) ABSTRACT

Disclosed are a distance measuring method and a distance measuring apparatus. During the distance measuring, an image is obtained. If the location of a center of gravity of the image is within a first segment, the calculating unit calculates a distance between the object and the distance measuring apparatus corresponding to the projection point, according to a first mapping relationship and the location of a center of gravity of the image. If the location of a center of gravity of the image is within a second segment, the calculating unit calculates a distance between the object and the distance measuring apparatus corresponding to the projection point according to a second mapping relationship and the location of a center of gravity of the image.

10 Claims, 6 Drawing Sheets

DISTANCE MEASURING METHOD AND APPARATUS

CROSS-REFERENCE TO RELATED APPLICATIONS

This is a continuation application of prior application Ser. No. 14/821,966 filed on Aug. 10, 2015, currently pending.

BACKGROUND OF THE INVENTION

1. Field of the Invention

The instant disclosure relates to a distance measuring method and a distance measuring apparatus; in particular, to an optical distance measuring method and an optical distance measuring apparatus.

2. Description of Related Art

To execute a short distance measurement or a long distance measurement in current optical sensing systems, the distances are all calculated via the same reciprocal mapping equation. However, when the resolution of the distance measuring photograph is not great enough, there may be errors that cannot be omitted in the long distance measurement that result from the characteristic of the reciprocal.

Currently, the function for automatically calculating distances between the surroundings has become necessary when using many home appliances or industrial equipment. If the resolution of the distance measuring photograph is not enough, there will be a certain offset of the center of gravity in the long distance measurement, which may result in damage to the equipment by collisions.

SUMMARY OF THE INVENTION

The instant disclosure provides a distance measuring method used in a distance measuring apparatus. The distance measuring apparatus comprises a calculating unit, a light source unit, an image sensing unit and a storage unit. The distance measuring method comprises: emitting a light signal via the light source unit to an object, wherein the light signal has a pattern having at least one light point; via the image sensing unit obtaining a distance-measuring image produced by projecting the light signal to the object, wherein the distance-measuring image has at least one projection light point formed by projecting the light point to the object; when a center of gravity of the distance-measuring image is located within a first segment, via the calculating unit calculating a distance between the distance measuring apparatus and the object according to a first mapping relationship stored in the storage unit and the location of the center of gravity of the distance-measuring image, wherein the first mapping relationship including a plurality of locations of first reference centers of gravity and corresponding reciprocals of first reference distances; and when the center of gravity of the distance-measuring image is located within a second segment, calculating a distance between the distance measuring apparatus and the object according to a second mapping relationship stored in the storage unit and the location of the center of gravity of the distance-measuring image, wherein the second mapping relationship including a plurality of locations of second reference centers of gravity and corresponding second reference distances.

The instant disclosure further provides a distance measuring apparatus comprising a light source unit, an image sensing unit, a storage unit and a calculating unit. The light source unit is used to emit a light signal to an object. The light signal has a pattern and the pattern has at least one light point. The image sensing unit is used to obtain a distance-measuring image produced by projecting the light signal to the object. The distance-measuring image has at least one projection light point formed by projecting the light point to the object. The storage unit is used to store a first mapping relationship and a second mapping relationship. The first mapping relationship includes a plurality of reciprocals of the first reference distances corresponding to a plurality of first reference centers of gravity, and the second mapping relationship includes a plurality of second reference distances corresponding to a plurality of second reference centers of gravity. The calculating unit calculates a distance between the object and the distance measuring apparatus according to a center of gravity of the distance-measuring image and the first mapping relationship when the center of gravity of the distance-measuring image is located within a first segment. On the other hand, the calculating unit calculates a distance between the object and the distance measuring apparatus according to the center of gravity of the distance-measuring image and the second mapping relationship when the center of gravity of the distance-measuring image is located within a second segment.

To sum up, when the centers of gravity of the distance-measuring image are located within different segments, the distance measuring method and apparatus in the instant disclosure calculate the distances between the object and the distance measuring apparatus according to different mapping relationships. Thereby, the distance measuring method and apparatus provided by the instant disclosure can help to reduce the error resulting from a long distance measurement, and thus the accuracy in both the long distance measurement and the short distance measurement can be improved.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1A:
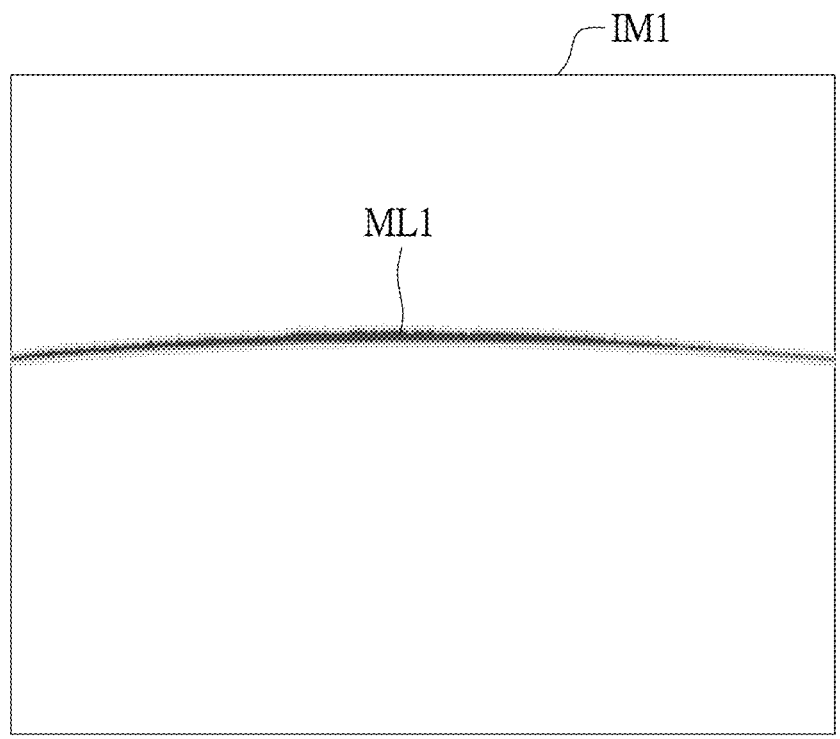
FIGS. 1A~1C show distance measuring photographs with different distance between an object and a distance measuring apparatus according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the instant disclosure. As used herein, the term "and/or" includes any and all combinations of one or more of the associated listed items.

The following description is going to illustrate the distance measuring method and apparatus provided by the instant disclosure with figures; however, it is not restricted by the embodiments below.

One Embodiment of the Distance Measuring Method

Figure 1B:
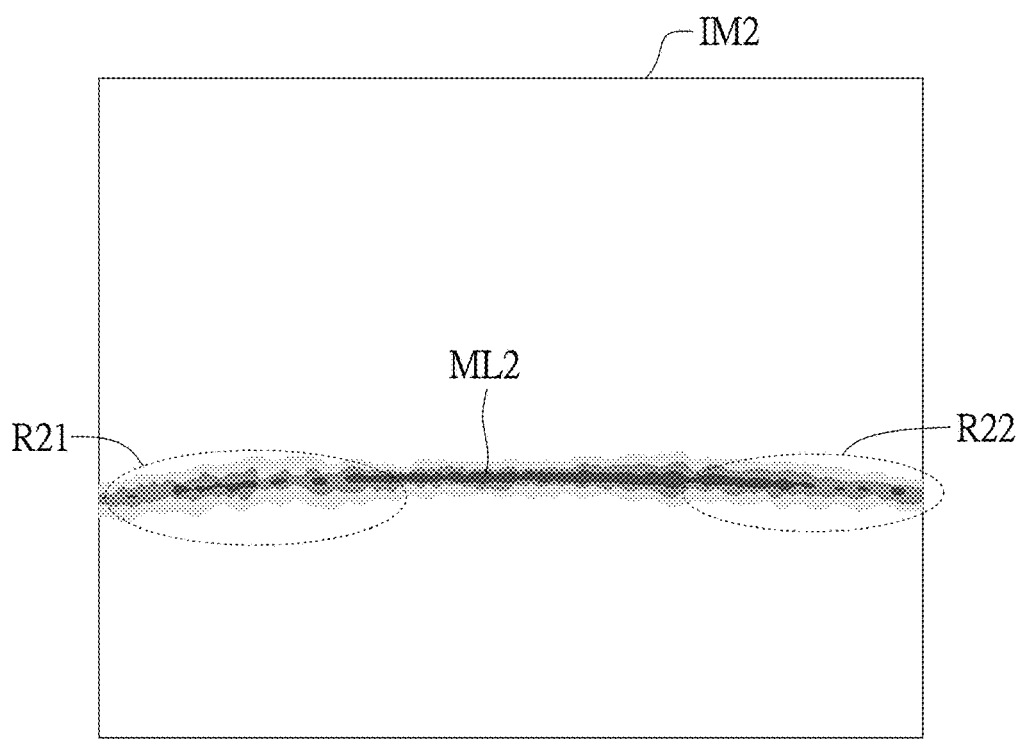
Figure 1C:
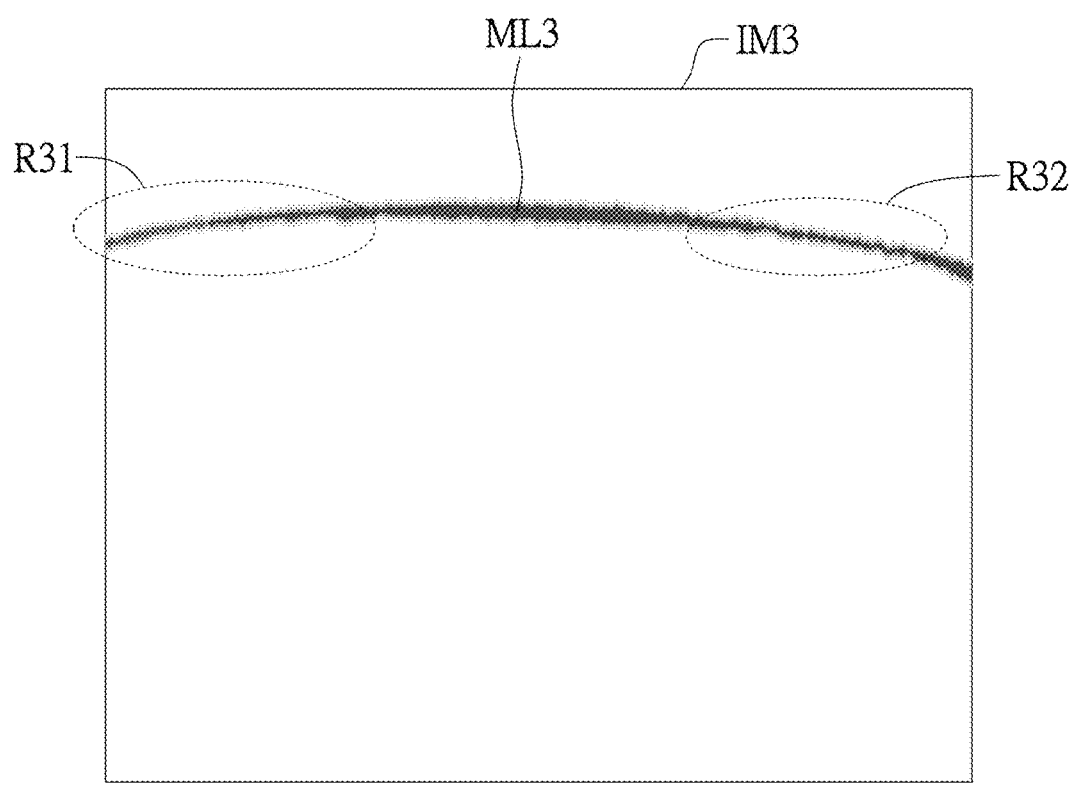

Please refer to FIGS. 1A~1C, which show distance measuring photographs with different distance between an object and a distance measuring apparatus according to an embodiment of the instant disclosure. FIG. 1A shows a distance measuring photograph IM1 taken when the distance between an object and a distance measuring apparatus is D1. In the distance measuring photograph IM1, there is a distance measuring photograph ML1 formed by a plurality of projection light points. FIG. 1B shows a distance measuring photograph IM2 taken when the distance between an object and a distance measuring apparatus is D2. In the distance measuring photograph IM2, there is a distance measuring photograph ML2 formed by a plurality of projection light points. FIG. 1C shows a distance measuring photograph IM3 taken when the distance between an object and a distance measuring apparatus is D3. In the distance measuring photograph IM3, there is a distance measuring photograph ML3 formed by a plurality of projection light points. It should be noted that, the distance D3 is smaller than the distance D1 and the distance D1 is smaller than the distance D2. For example, the distances D1~D3 are 10 cm, 25 cm and 3 cm, respectively; however, it is not limited therein.

As shown in FIGS. 1A and 1B, when compared with the distance-measuring image ML1 formed by a plurality of projection light points, the distance-measuring image ML2 formed by a plurality of projection light points is located lower. Also, as shown in FIGS. 1A and 1C, comparing with the distance-measuring image ML1 formed by a plurality of projection light points, the distance-measuring image ML3 formed by a plurality of projection light points is located higher. Moreover, as shown in FIGS. 1B and 1C, the resolution of the distance measuring photograph is insufficient and the signal noise ratio is larger when the distance between the object and the distance measuring apparatus is long, so that an offset generated when taking a distance measurement with the gravity location of the projection light points in two side areas R21 and R22 of the distance-measuring image ML2 based on the reciprocal mapping equation would be larger than an offset generated when taking a distance measurement with the gravity location of the projection light points in two side areas R31 and R32 of the distance-measuring image ML2 based on the reciprocal mapping equation.

Figure 2A:
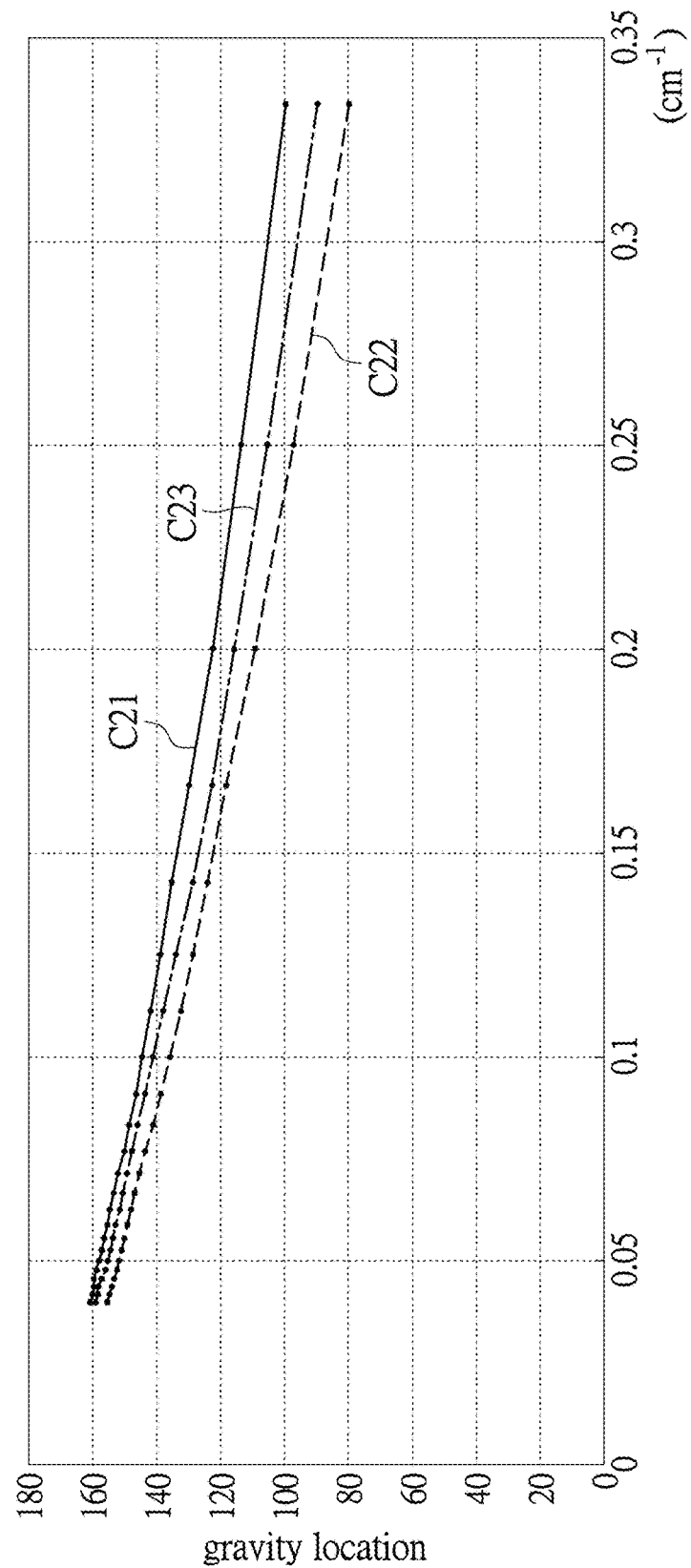
FIG. 2A shows a waveform showing a relationship between locations of gravity centers at each pixel of the distance-measuring image and reciprocals of distances between an object and a distance measuring apparatus according to an embodiment of the instant disclosure.
Figure 2B:
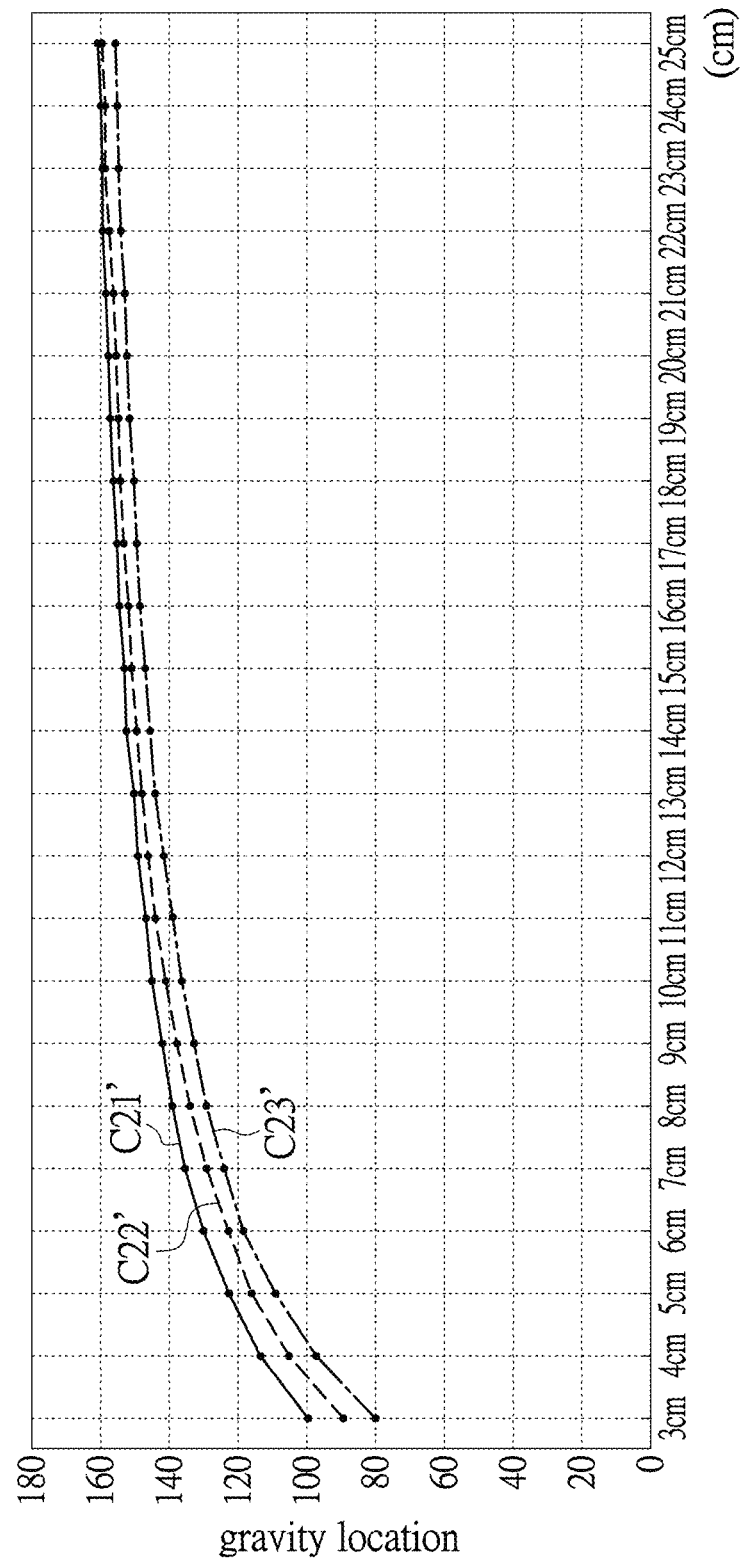
FIG. 2B shows a waveform showing a relationship between locations of gravity centers at each pixel of the distance-measuring image and distances between an object and a distance measuring apparatus according to an embodiment of the instant disclosure.

In conjunction with FIG. 2A and FIG. 2B, FIG. 2A shows a waveform showing a relationship between locations of gravity centers at each pixel of the distance-measuring image and reciprocals of distances between an object and a distance measuring apparatus according to an embodiment of the instant disclosure, and FIG. 2B shows a waveform showing a relationship between locations of gravity centers at each pixel of the distance-measuring image and distances between an object and a distance measuring apparatus according to an embodiment of the instant disclosure.

As shown in FIG. 2A, curves C21, C22 and C23 represent of three different relationships between three different locations of gravity centers at three different pixels of the distance-measuring image and reciprocals of distances between an object and a distance measuring apparatus To be detailed, according to the curve shown in FIG. 2A, during a distance measurement, the distance between the object and the distance measurement corresponding to certain pixel can be calculated based on the relationship shown by the curve in FIG. 2A and also based on this calculate the gravity location of the projection light points of the distance-measuring image at each pixel. It is worth mentioning that, according to the three curves with respect to different pixel values shown in FIG. 2A, because of the character of the reciprocal, the distance difference calculated when the distance between the object and the distance measuring apparatus is above 10 cm (that is, the reciprocal of the distance between them is below 0.1) would be much larger than the distance difference calculated when the distance between the object and the distance measuring apparatus is below 10 cm.

In other words, when taking a 2D optical far distance measurement, because of the insufficient resolution and the bad signal noise, it is easy to generate gravity location offset of the projection light points, and so the character of the reciprocal shown in the curve in FIG. 2A results in an error that can't be ignored when calculating the distance between the object and the distance measuring apparatus.

On the other hand, in FIG. 2B, the curves C21', C22' and C23' respectively represent a distance relationship between the calculated gravity locations of the projection light points at different pixels in the distance measuring photograph and the distance between the object and the distance measuring apparatus. Further, transferring the x-axis representing the distance reciprocal in FIG. 2A into the x-axis representing the distance makes the curves in FIG. 2B. Thus, during the distance measurement, the distance between the object and the distance measuring apparatus at a certain pixel can also be calculated based on the relationship shown in FIG. 2B as can the gravity locations of projection light points at each pixel in the distance-measuring image.

It should be noted that, as shown in FIG. 2B, the x-axis presents the distance but not the reciprocal of distance, so the error when calculating the distance between the object and the distance measuring apparatus resulting from the gravity location offset of the projection light points would decrease when the distance between the object and the distance measuring apparatus is above 10 cm. In other words, when taking a far distance measurement, the error can be efficiently reduced by using the curve shown in FIG. 2B to calculate the distance between the object and the distance measuring apparatus The following paragraphs further describe the working principle of the distance measuring method according to this embodiment.

According to the relationships shown by the curves in both FIG. 2A and FIG. 2B, a distance measuring method is provided in this embodiment.

Figure 3:
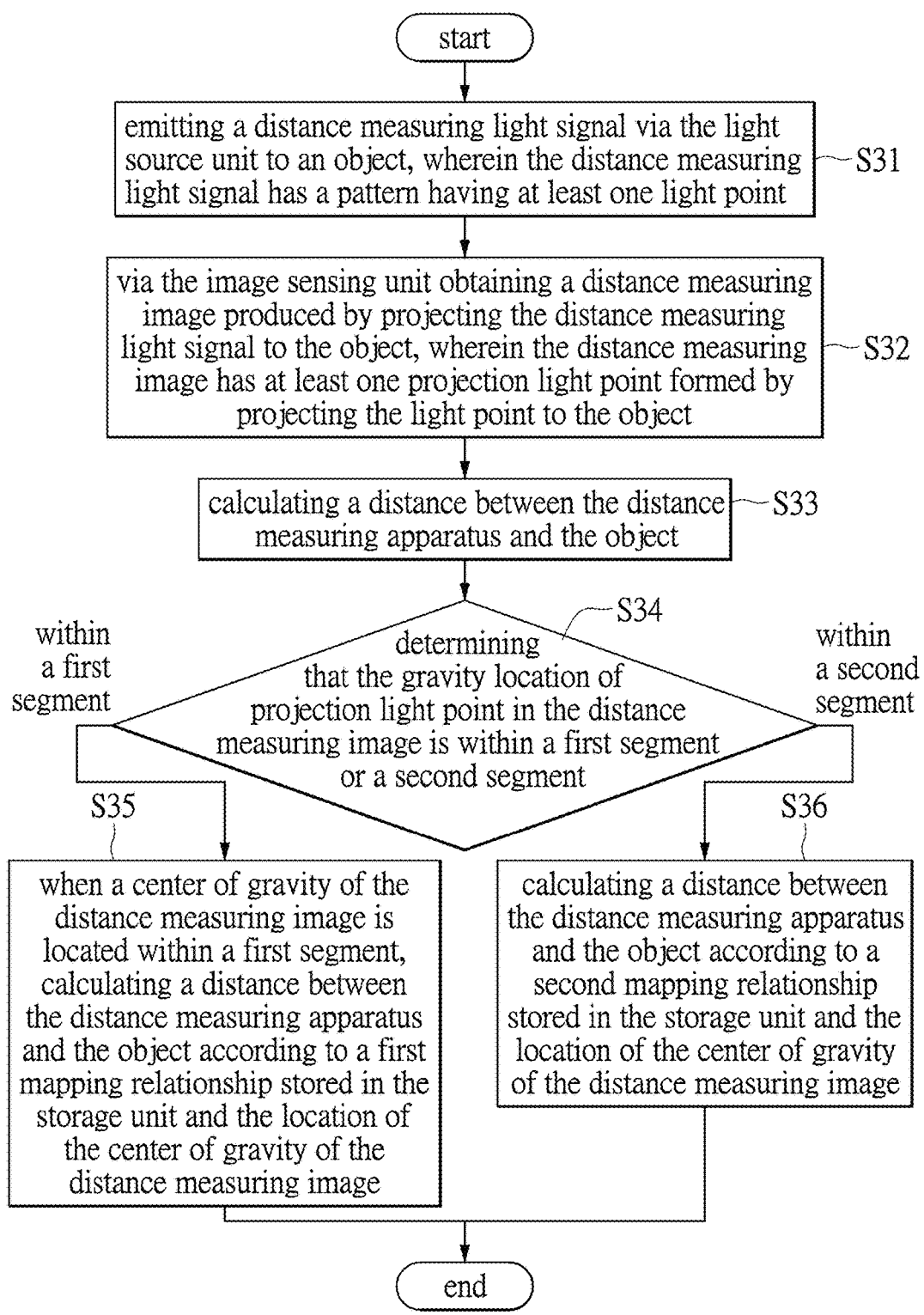
FIG. 3 shows a flow chart of a distance measuring method according to an embodiment of the instant disclosure.

Please refer to FIG. 3, FIG. 3 shows a flow chart of a distance measuring method according to an embodiment of the instant disclosure. As shown in FIG. 3, the distance measuring method comprises the following steps: emitting a light signal via the light source unit to an object, wherein the light signal has a pattern having at least one light point (Step S31); via the image sensing unit obtaining a distance-measuring image produced by projecting the light signal to the object, wherein the distance-measuring image has at least one projection light point formed by projecting the light point to the object (Step S32); calculating a distance between the distance measuring apparatus and the object (Step S33); determining that the gravity location of projection light point in the distance-measuring image is within a first segment or a second segment (Step S34); when a center of gravity of the distance-measuring image is located within a first segment, calculating a distance between the distance measuring apparatus and the object according to a first mapping relationship stored in the storage unit and the location of the center of gravity of the distance-measuring image (Step S35); and when the center of gravity of the distance-measuring image is located within a second segment, calculating a distance between the distance measuring apparatus and the object according to a second mapping relationship stored in the storage unit and the location of the center of gravity of the distance-measuring image (Step S36).

In this embodiment, the first mapping relationship as described in the Step S35 includes a plurality of locations of first reference centers of gravity and corresponding reciprocals of first reference distances, as shown by the curves in FIG. 2A. Also, the second mapping relationship as described in the Step S35 includes a plurality of locations of second reference centers of gravity and corresponding second reference distances, as shown by the curves in FIG. 2B.

In one embodiment, according to the relationships shown by the curves in FIG. 2A and FIG. 2B, in the Step S34, the distance between the object and the distance measuring apparatus corresponding to the first segment of the gravity location ranges from 3 cm to 10 cm and the distance between the object and the distance measuring apparatus corresponding to the second segment ranges from 10 cm to 25 cm. However, it is not limited herein.

In one embodiment, the pattern of the light signals emitted on the object by the light source unit has the plurality of light points forming a horizontal line. According to different pixels in the distance-measuring image, the light points correspond to different first mapping relationships, such as the plurality of curves C21~C23 shown in FIG. 2A. Moreover, according to different pixels in the distance-measuring image, the light points can also correspond to different first mapping relationships, such as the plurality of curves C21'~C23' shown in FIG. 2B.

In one embodiment, when calculating the distance between the object and the distance measuring apparatus according to the first mapping relationship, if the center of gravity of the distance-measuring image is located between two adjacent first reference centers of gravity, an interpolation method can be used for calculating a reciprocal of distance corresponding to the center of gravity of the distance-measuring image according to two reciprocals of the first reference distances corresponding to two adjacent first reference centers of gravity. After that, the distance between the object and the distance measuring apparatus can be calculated according to the reciprocal of distance corresponding to the center of gravity of the distance-measuring image. On the other hand, when calculating the distance between the object and the distance measuring apparatus according to the second mapping relationship, if the center of gravity of the distance-measuring image is located between two adjacent second reference centers of gravity, an interpolation method can be used for calculating the distance between the object and the distance measuring apparatus corresponding to the center of gravity of the distance-measuring image according to the two second reference distances corresponding to locations of the two adjacent second reference centers of gravity.

One Embodiment of the Distance Measuring Apparatus

Figure 4:
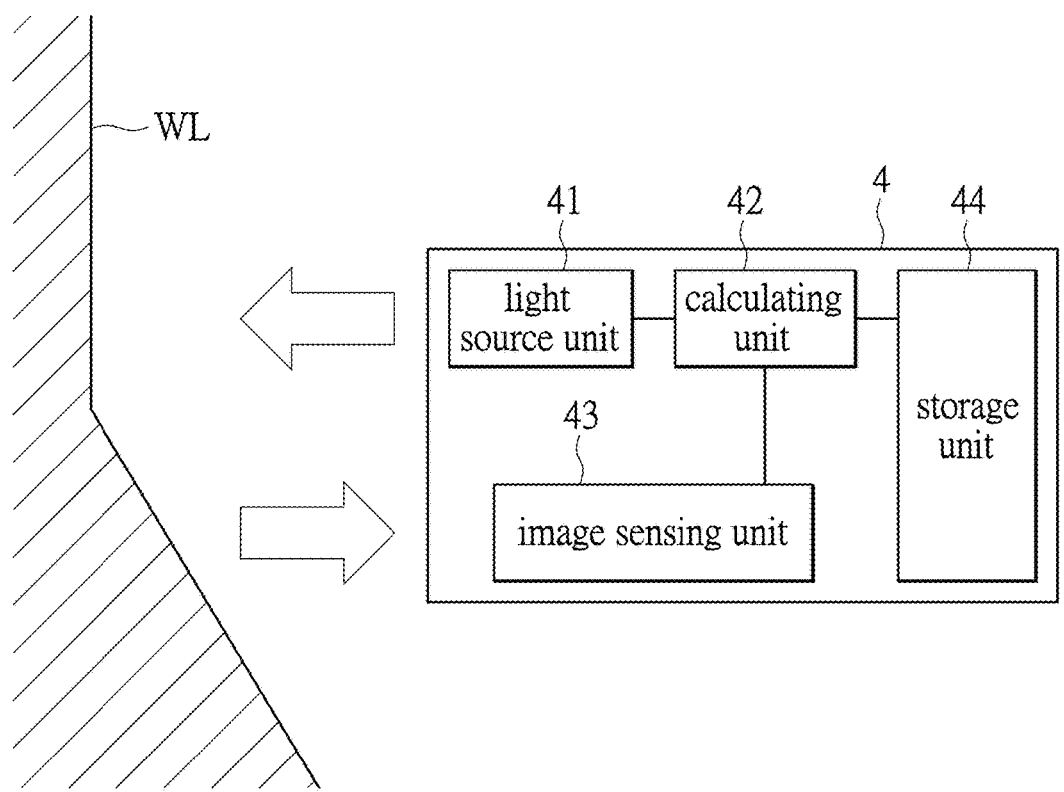
FIG. 4 shows a block diagram of a distance measuring apparatus according to an embodiment of the instant disclosure.

Please refer to FIG. 4, FIG. 4 shows a block diagram of a distance measuring apparatus according to an embodiment of the instant disclosure. As shown in FIG. 4, a distance measuring apparatus 4 for implementing the distance measuring method comprises a light source unit 41, a calculating unit 42, an image sensing unit 43 and a storage unit 44. Regarding the light source unit 41 and the image sensing unit 43, as shown by the arrow direction in FIG. 4, the light source unit 41 is used to emit a light signal to an object, such as a polygonal wall WL. The light signal has a pattern and the pattern has at least one light point. Moreover, the image sensing unit 43 is used to obtain a distance-measuring image produced by projecting the light signal to the object, such as the distance-measuring images IM1~IM3 shown in FIGS. 1A~1C. The distance-measuring image has at least one projection light point formed by projecting the light point to the object.

Regarding the storage unit 44, the storage unit 44 is used to store a first mapping relationship and a second mapping relationship. The first mapping relationship includes a plurality of reciprocals of the first reference distances corresponding to a plurality of first reference centers of gravity. As shown in FIG. 2A, a plurality of curves C21~C23 show the relationship between the gravity location of the projection light point at different pixels in the distance-measuring image and the distance reciprocal of the distance between the object and the distance measuring apparatus 4. Also, the second mapping relationship includes a plurality of the second reference distances corresponding to a plurality of second reference centers of gravity. As shown in FIG. 2B, a plurality of curves C21'~C23' show the relationship between the gravity location of the projection light point at different pixels in the distance-measuring image and the distance between the object and the distance measuring apparatus 4.

Regarding to the calculating unit 42, when the center of gravity of the distance-measuring image is located between two adjacent first reference centers of gravity, the calculating unit 42 via an interpolation method calculates a reciprocal of distance corresponding to the center of gravity of the distance-measuring image according to two reciprocals of the first reference distances corresponding to two adjacent first reference centers of gravity. After that, the calculating unit 42 calculates the distance between the object and the distance measuring apparatus 4 according to the reciprocal of distance corresponding to the center of gravity of the distance-measuring image. On the other hand, when the center of gravity of the distance-measuring image is located between two adjacent second reference centers of gravity, the calculating unit 42 via an interpolation method calculates the distance between the object and the distance measuring apparatus 4 corresponding to the center of gravity of the distance-measuring image according to the two second reference distances corresponding to locations of the two adjacent second reference centers of gravity.

In one embodiment, according to the curves shown in FIG. 2A and FIG. 2B, the distance between the object and the distance measuring apparatus 4 corresponding to the first segment of the gravity location ranges from 3 cm to 10 cm and the distance between the object and the distance measuring apparatus 4 corresponding to the second segment ranges from 10 cm to 25 cm. However, it is not limited herein.

In one embodiment, the pattern of the light signals emitted on the object by the light source unit has the plurality of light points forming a horizontal line. According to different pixels in the distance-measuring image, the light points correspond to different first mapping relationships, such as the plurality of curves C21~C23 shown in FIG. 2A. Moreover, according to different pixels in the distance-measuring image, the light points can also correspond to different second mapping relationships, such as the plurality of curves C21'~C23' shown in FIG. 2B.

In one embodiment, when the calculating unit 42 calculates the distance between the object and the distance measuring apparatus 4 according to the first mapping relationship, if the center of gravity of the distance-measuring image is located between two adjacent first reference centers of gravity, an interpolation method can be used for calculating a reciprocal of distance corresponding to the center of gravity of the distance-measuring image according to two reciprocals of the first reference distances corresponding to two adjacent first reference centers of gravity. After that, the distance between the object and the distance measuring apparatus can be calculated according to the reciprocal of distance corresponding to the center of gravity of the distance-measuring image. On the other hand, when the calculating unit 42 calculates the distance between the object and the distance measuring apparatus 4 according to the second mapping relationship, if the center of gravity of the distance-measuring image is located between two adjacent second reference centers of gravity, an interpolation method can be used for calculating the distance between the object and the distance measuring apparatus 4 corresponding to the center of gravity of the distance-measuring image according to the two second reference distances corresponding to locations of the two adjacent second reference centers of gravity.

It should be noted that, as shown in the embodiment of FIG. 4, the object is a polygonal wall WL, so the distance measuring apparatus 4 needs to precisely measure the shorter distance and the longer distance between itself and the polygonal wall WL. According to the above description, the distance measuring apparatus for implementing the distance measuring method provided by the instant disclosure can reduce the error possibly generated during the far distance measurement, and thus can provide the precision regarding both to the far distance measurement and the short distance measurement. Thereby, in this embodiment, the shorter distance and the longer distance between the distance measuring apparatus 4 and the polygonal wall WL can be both precisely measured. For example, when the distance measuring apparatus 4 is applied to a device with a collision avoidance module, by precisely measuring the shorter distance and the longer distance between the distance measuring apparatus 4 and the polygonal wall WL, there will be less chance to have collisions between the device and the surroundings, which can actually extend the life-time of the device.

To sum up, when the centers of gravity of the distance-measuring image are located within different segments, the distance measuring method and apparatus in the instant disclosure can calculate the distances between the object and the distance measuring apparatus according to different mapping relationships. Thereby, the distance measuring method and apparatus provided by the instant disclosure can help to reduce the error resulting from a long distance measurement, and thus the accuracy in both the long distance measurement and the short distance measurement can be improved.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A distance measuring method comprising:
    emitting a light signal to an object, wherein the light signal has a pattern having a plurality of light points and the light points form a horizontal line;
    obtaining an image produced by projecting the light signal to the object, wherein the image is a horizontal line image formed by a plurality of projection light points and the projection light points are formed by projecting the light points to the object;
    calculating a distance between a distance measuring apparatus and the object according to a variation of the horizontal line image; and
    calculating a distance between the distance measuring apparatus and the object according to a first mapping relationship stored in a storage unit and a location of a center of gravity of the image, wherein the first mapping relationship includes a plurality of locations of first reference centers of gravity and corresponding reciprocals of first reference distances when the center of gravity of the image is located within a first segment, via a calculating unit.

2. The distance measuring method according to claim 1, wherein when the center of gravity of the image is located within a second segment, calculating a distance between the distance measuring apparatus and the object according to a second mapping relationship stored in the storage unit and the location of the center of gravity of the image, wherein the second mapping relationship including a plurality of locations of second reference centers of gravity and corresponding second reference distances.

3. The distance measuring method according to claim 1, wherein the first segment ranges from 3 cm to 10 cm and a second segment ranges from 10 cm to 25 cm.

4. The distance measuring method according to claim 1, wherein the light points correspond to different first mapping relationships and different second mapping relationships.

5. The distance measuring method according to claim 1, further comprising:
    when the center of gravity of the image is located between two adjacent first reference centers of gravity, via an interpolation method, calculating a reciprocal of distance corresponding to the center of gravity of the image according to two reciprocals of the first reference distances corresponding to two adjacent first reference centers of gravity, and calculating the distance between the object and the distance measuring apparatus according to the reciprocal of distance corresponding to the center of gravity of the image; and when the center of gravity of the image is located between two adjacent second reference centers of gravity, via an interpolation method, calculating the distance between the object and the distance measuring apparatus corresponding to the center of gravity of the image according to the two second reference distances corresponding to locations of the two adjacent second reference centers of gravity.

6. A distance measuring apparatus, comprising:

a light source unit, used to emit a light signal to an object, wherein the light signal has a pattern and the pattern has a plurality of light points and the light points form a horizontal line;

an image sensing unit, used to obtain an image produced by projecting the light signal to the object, wherein the image is a horizontal line image formed by a plurality of projection light points and the projection light points are formed by projecting the light points to the object;

a calculating unit, calculating a distance between the distance measuring apparatus and the object according to a variation of the horizontal line image; and a storage unit, used to store a first mapping relationship and a second mapping relationship, wherein the first mapping relationship includes a plurality of reciprocals of first reference distances corresponding to a plurality of first reference centers of gravity and the second mapping relationship includes a plurality of second reference distances corresponding to a plurality of second reference centers of gravity, wherein the calculating unit calculates a distance between the object and the distance measuring apparatus according to the center of gravity of the image and the first mapping relationship when the center of gravity of the image is located within a first segment, and calculates a distance between the object and the distance measuring apparatus according to the center of gravity of the image and the second mapping relationship when the center of gravity of the image is located within a second segment.

7. The distance measuring apparatus according to claim 6, wherein the first segment ranges from 3 cm to 10 cm and the second segment ranges from 10 cm to 25 cm.

8. The distance measuring apparatus according to claim 6, wherein the light points correspond to different first mapping relationships and different second mapping relationships.

9. The distance measuring apparatus according to claim 6, wherein when the center of gravity of the image is located between two adjacent first reference centers of gravity, via an interpolation method, the distance measuring apparatus calculates a reciprocal of distance corresponding to the center of gravity of the image according to two reciprocals of the first reference distances corresponding to two adjacent first reference centers of gravity, and calculates the distance between the object and the distance measuring apparatus according to the reciprocal of distance corresponding to the center of gravity of the image; and wherein when the center of gravity of the image is located between two adjacent second reference centers of gravity, via an interpolation method, the distance measuring apparatus calculates the distance between the object and the distance measuring apparatus corresponding to the center of gravity of the image according to the two second reference distances corresponding to locations of the two adjacent second reference centers of gravity.

10. A distance measuring apparatus, comprising:

a light source unit, used to emit a light signal to an object, wherein the light signal has a pattern and the pattern has a plurality of light points and the light points form a horizontal line;

an image sensing unit, used to obtain an image produced by projecting the light signal to the object, wherein the image is a horizontal line image formed by a plurality of projection light points and the projection light points are formed by projecting the light points to the object; and a calculating unit, calculating a distance between a distance measuring apparatus and the object according to a variation of the horizontal line image;

wherein the calculating unit calculates a distance between the object and the distance measuring apparatus according to a center of gravity of the image and a first mapping relationship when the center of gravity of the image is located within a first segment, and calculates a distance between the object and the distance measuring apparatus according to the center of gravity of the image and a second mapping relationship when the center of gravity of the image is located within a second segment.

* * * * *